W. L. CULLY.
BATTERY CHARGING SYSTEM.
APPLICATION FILED JAN. 9, 1920.
1,400,268.
Patented Dec. 13, 1921.
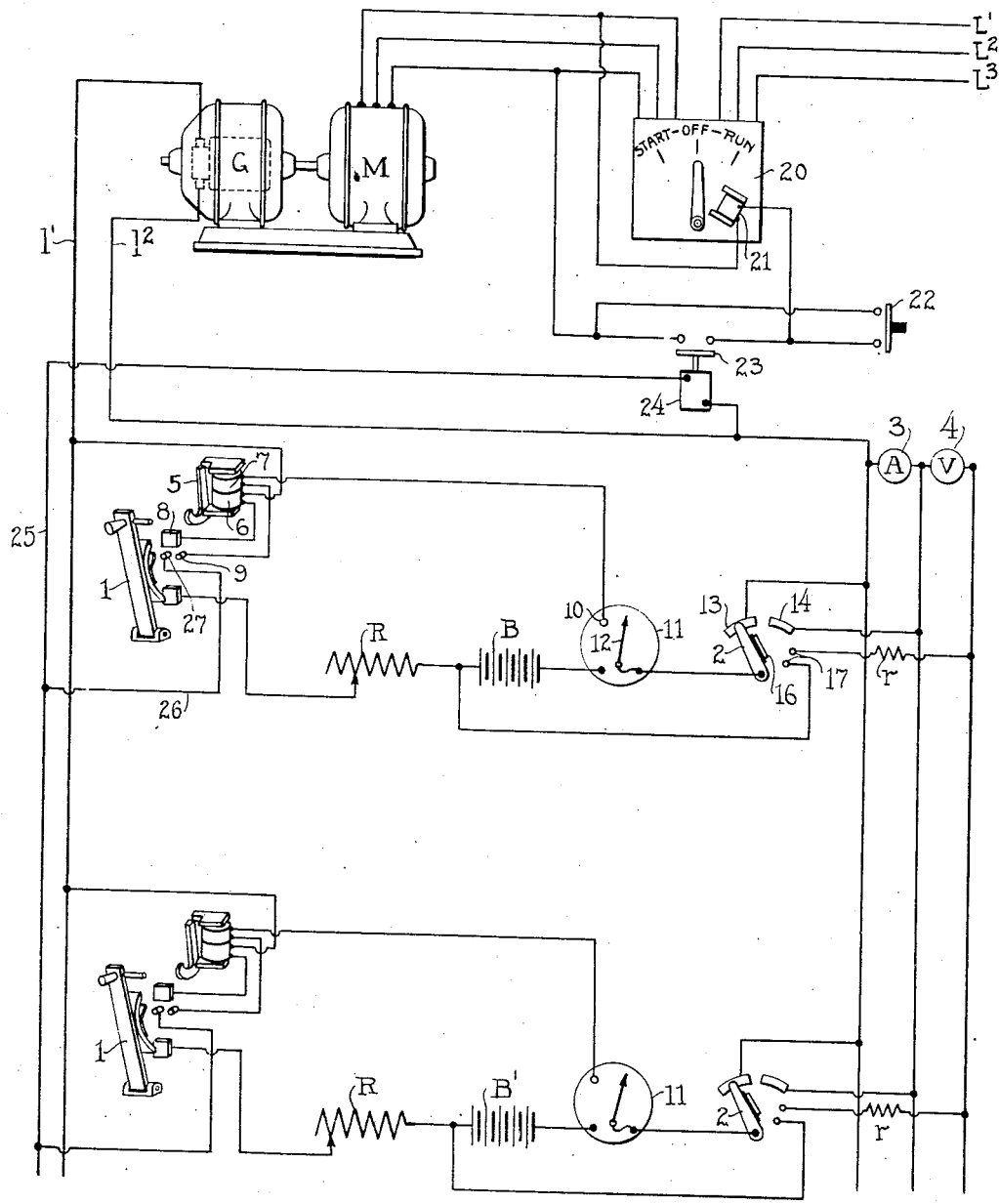
INVENTOR.
William L. Cully
BY
Franklin M. Hubbard
ATTORNEY

UNITED STATES PATENT OFFICE.

WILLIAM L. CULLY, OF NEW YORK, N. Y., ASSIGNOR TO THE CUTLER-HAMMER MFG. CO., OF MILWAUKEE, WISCONSIN, A CORPORATION OF WISCONSIN.

BATTERY-CHARGING SYSTEM.

1,400,268.  Specification of Letters Patent.  Patented Dec. 13, 1921.

Application filed January 9, 1920. Serial No. 350,287.

*To all whom it may concern:*

Be it known that I, WILLIAM L. CULLY, a citizen of the United States, residing at 70 West 128th St., in the county of New York and State of New York, have invented new and useful Improvements in Battery-Charging Systems, of which the following is a full, clear, concise, and exact description, reference being had to the accompanying drawing, forming a part of this specification.

This invention relates to battery charging systems, and more particularly to those employing motor generator sets for supplying charging current.

Such systems have heretofore been provided with means for automatically disconnecting the batteries when adequately charged but without stopping the motor generator set upon disconnection of the last battery. Thus where an attendant is not always at hand the motor generator set is likely to run idly and the present invention has among its objects to provide such a system with means for stopping the motor generator set automatically when all of the batteries supplied thereby are disconnected therefrom.

Other objects and advantages of the invention will hereinafter appear.

The accompanying drawing illustrates one embodiment of the invention which will now be described, it being understood that the embodiment illustrated is susceptible of various modifications without departing from the scope of the appended claims.

Referring to the drawing, the same shows a motor generator set comprising a motor M and generator G, the latter supplying current to two batteries B, B' although it is to be understood that a greater number of batteries might be connected to said generator.

The battery B is provided with a switch 1 for connecting the same across the charging lines $l'$, $l^2$, an adjustable rheostat R in series therewith and a meter switch 2 to establish connections to an ammeter 3 and voltmeter 4. The switch 1 is biased to open position and is provided with a latch 5 to hold the same in closed position, said latch being under the control of electro-magnetic windings 6 and 7. The winding 6 is connected between line $l'$ and a contact 8 of switch 1 to be connected in series with the battery when the switch is closed and to function to hold said switch closed subject to release upon an abnormal drop in current. The winding 7 acts in opposition to the winding 6 and is connected between a contact 9 of the switch and a contact 10 of an ampere hour meter 11 in circuit with the battery. The needle 12 of the ampere hour meter has a connection whereby its engagement with the contact 10 energizes the winding 7 to effect release of the switch 1 when the battery has received a given charge. The switch 2 comprises an arm engageable with a contact 13 to connect the battery directly to line $l^2$ and engageable with a contact 14 to connect the battery to said line through ammeter 3. Also, the arm carries an insulated contact 16 adapted to bridge a pair of contacts 17 to establish voltmeter connections through a resistance $r$.

The battery B' is shown as provided with similar control means whereby it may be controlled independently of the battery B. However, it is to be understood that the batteries might be provided with any other preferred control means affording automatic disconnecton thereof when charged to the desired degree.

The motor M, which may in practice be supplied from any suitable source of current, is shown as supplied from a three phase circuit $L'$, $L^2$, $L^3$ through a starting device 20 of any preferred type which is biased to a position to disconnect the motor from circuit and adapted to be held in running position by an electromagnet 21. The magnet 21 is connected across lines $L'$, $L^3$ through parallel switches 22 and 23, said switches being normally open and the former being manually operable while the latter is provided with an operating winding 24. The winding 24 has one terminal thereof permanently connected to charging line $l^2$ and its opposite terminal connected by conductors 25 and 26 to a contact 27 of each of the switches 1. Thus closure of either of the latter switches connects said winding to charging line $l'$ for energization thereof and consequent closure of switch 23 while opening of all of the switches effects deenergization of said winding and consequent opening of switch 23.

After starting the motor M by the device 20 said device may be held in running position by closure of switch 22 and upon connection of either of the batteries to the charging lines the windng 24 of switch 23 will respond to close said switch, thus paralleling switch 22. Accordingly if switch 22 be then opened the magnet 21 of the starting device will be maintained energized as long as any one of the batteries is connected while on the other hand, disconnection of all of the batteries will deënergize the winding of switch 23 thereby releasing the starting switch 20 to stop the motor generator set.

Moreover as will be apparent, the means illustrated provide for stopping the motor generator set upon failure of the generator voltage, such failure of voltage resulting in deënergizing the holding windings of switches 1 thus permitting the same to open with the results described.

What I claim as new and desire to secure by Letters Patent is:

1. In a battery charging system, the combination with a motor generator set and control means therefor, of separately operable means to connect a battery to said motor generator set for charging, the former means being directly controlled by the latter means to arrest operation of said motor generator set upon operation of said latter means to disconnect the battery.

2. In a battery charging system, the combination with a motor generator set and control means therefor, of a battery and means to establish connections between said battery and said motor generator set the control means of said motor generator set being directly controlled by the latter means and said latter means being dependent upon the connection and condition of the battery to effect continued operation of said motor generator set.

3. In a battery charging system, the combination with a motor generator set and control means therefor including an electro-responsive winding, of a battery and means for establishing charging connections between said motor generator set and said battery, the last-mentioned means also controlling the circuit of said relay and tending through control thereof to stop said motor generator set upon charging of said battery to a given degree and also upon premature disconnection of said battery.

4. In a battery charging system, the combination with a motor generator set and control means therefor, of a plurality of battery charging circuits to be supplied by said motor generator set and separate control means for said circuits jointly and directly controlling the first-mentioned means to render operation of said motor generator set dependent upon completion of at least one of said charging circuits.

5. In a battery charging system, the combination with a motor generator set and control means therefor including an electro-responsive relay having a plurality of parallel control circuits, of a plurality of battery charging circuits to be supplied by said motor generator set and separate control means for said circuits each controlling one of the parallel circuits of said relay whereby operation of said motor generator set is rendered dependent upon completion of at least one of said battery charging circuits.

6. In a battery charging system in combination, a motor generator set, a plurality of switches each adapted to connect a battery to said motor generator set for charging and each being biased to open position and having a winding in series with its respective battery to hold the same closed, means associated with each of said switches to effect release thereof when its respective battery has received a given charge and control means for said motor generator set rendering operation thereof dependent upon retention of at least one of said switches in closed position.

7. In a battery charging system, in combination, a motor generator set, starting means therefor including an electro-responsive device deënergization of which effects stopping of said motor generator set and means operable to connect a battery to said motor generator set for charging and to establish an energizing circuit for said electro-responsive device, said means being operable automatically to disconnect said battery when subjected to a given charge and to interrupt said energizing circuit of said device.

8. In a battery charging system, in combination, a motor generator set, a starting device therefor biased to off position and having an electromagnet for holding the same in running position, means for connecting a battery to said motor generator set for charging and for disconnecting said battery when subjected to a given charge and an electro-responsive control switch for said electromagnet having an energizing circuit to be controlled by said means.

9. In a battery charging system, in combination, a motor generator set, a starting device therefor biased to off position and having an electromagnet for holding the same in running position, separately operable switches each to connect a battery to said motor generator set for charging and an electro responsive control switch for said electromagnet having parallel energizing circuits respectively controlled by said battery switches.

In witness whereof, I have hereunto subscribed my name,

WILLIAM L. CULLY.